United States Patent [19]
Nishimura

[11] Patent Number: 5,771,409
[45] Date of Patent: Jun. 23, 1998

[54] DRIVING MECHANISM FOR PHOTOGRAPHIC LENS

[75] Inventor: Syunji Nishimura, Ohmiya, Japan

[73] Assignee: Fuji Photo Optical Co., Ltd., Japan

[21] Appl. No.: 733,401

[22] Filed: Oct. 18, 1996

[30] Foreign Application Priority Data

Oct. 20, 1995 [JP] Japan .................................... 7-295942

[51] Int. Cl.$^6$ .................................................. G03B 17/00
[52] U.S. Cl. .............................. 396/72; 396/85; 359/699; 359/697; 359/694; 359/704
[58] Field of Search ........................ 396/72, 85; 359/694, 359/695, 696, 699, 700, 701

[56] References Cited

U.S. PATENT DOCUMENTS

| | | | |
|---|---|---|---|
| 5,373,397 | 12/1994 | Satoh et al. | 359/699 |
| 5,376,983 | 12/1994 | Yamazaki et al. | 396/72 |
| 5,488,513 | 1/1996 | Tanaka | 359/699 |
| 5,535,057 | 7/1996 | Nomura et al. | 359/694 |
| 5,543,971 | 8/1996 | Nomura et al. | 359/697 |
| 5,548,446 | 8/1996 | Enomoto | 359/700 |
| 5,574,526 | 11/1996 | Kato | 396/133 |
| 5,581,411 | 12/1996 | Nomura et al. | 359/704 |
| 5,636,064 | 6/1997 | Nomura et al. | 359/704 |

FOREIGN PATENT DOCUMENTS

5-80244 4/1993 Japan .
7-128567 5/1995 Japan .

*Primary Examiner*—Russell E. Adams
*Attorney, Agent, or Firm*—Price, Heneveld, Cooper, DeWitt & Litton

[57] ABSTRACT

A driving mechanism is disclosed for photographic lens having a stationary lens barrel, a first driving lens barrel adapted to be rotated and moved back and forth relative to the stationary lens barrel, a second driving lens barrel operatively associated with the first driving lens barrel by the aid of a rotation transmitting structure so as to be rotated and moved back and forth relative to the first driving lens barrel, and a movable lens barrel holding a front lens group and being movable back and forth relative to the second driving lens barrel. With this arrangement, power varying or focusing is achieved with a relatively small-sized lens barrel assembly by moving a rear lens group back and forth under a regulating action of the second driving lens barrel. The first driving lens barrel is rotatably received by and operatively associated with the stationary lens barrel through helicoids formed on these two lens barrels. The second driving lens barrel is rotatably received by and operatively associated with the first driving lens barrel through helicoids formed on these two lens barrels. The movable lens barrel is received by and operatively associated with the second driving lens barrel through helicoids formed on these two lens barrels. Rotation of the first driving lens barrel is transmitted by gears to the second driving lens barrel so as to rotate the second driving lens barrel in a direction opposite to that in which the first driving lens barrel rotates.

20 Claims, 3 Drawing Sheets

DRIVING MECHANISM FOR PHOTOGRAPHIC LENS

BACKGROUND OF THE INVENTION

The present invention relates to a driving mechanism for photographic lens adapted to move the photographic lens back and forth in parallel to an optical lens for power varying or focusing.

DESCRIPTION OF THE RELATED ART

As photographic cameras become more popular, marketing trends require that cameras be more and more compact, thin, and lightweight and simultaneously contain a power varying mechanism such as a zoom mechanism or focus change-over mechanism. The power varying mechanism functions to move the photographic lens back and forth in a direction parallel to an optical axis, for example, to move the photographic lens with respect to a camera body for telephoto and move the photographic lens back toward the camera body for wide-angle or standard photo. Thus, a lens barrel holding the photographic lens is moved back and forth relative to the camera body in parallel to the optical axis.

In order to assure that the photographic lens can be moved within a given range to obtain a desired magnification while making the camera as thin as possible, the lens barrel must be constructed with four stages of which three stages can be successively moved. More specifically, the lens barrel must be constructed so that a first driving lens barrel is movable back and forth relative to a stationary lens barrel, a second driving lens barrel is movable back and forth relative to the first driving lens barrel, and a movable lens barrel holding a part of the photographic lens is movable back and forth relative to the second driving lens barrel. By adopting such an arrangement, it is possible to limit a length of the lens barrel in the direction of the optical axis approximate to a length of the stationary lens barrel and to obtain a moving range of the photographic lens approximately corresponding to three times the length of the stationary lens barrel. The respective stages of the lens barrel must keep the photographic optical system in a predetermined optical relationship during their movement.

A driving mechanism to move the lens barrel back and forth utilizing a cam barrel is also well-known and the above-mentioned arrangement can be adopted in such a driving mechanism. However, a length of the cam will be unacceptably increased to assume an adequate moving range of the lens barrel while making the camera body as thin as possible. Consequently a cam slit must be formed in the lens barrel over its full length, resulting in an apprehension that the strength of the lens barrel might be unacceptably decreased. Particularly, in the case of the photographic lens adopting a power varying/focusing mechanism which relies upon a single cam so that a single power source may be used so that cost savings may be realized by utilizing a single cam, the cam will be inevitably made longer and the cam strength will correspondingly decrease. To avoid such an inconvenience, a cam groove having a bottom, instead of a cam in the form of a through-hole, has been adopted as the cam formed in the lens barrel.

It is also well-known from Japanese Patent Application Disclosure Gazette No. 1995-128567 to move one driving lens barrel back and forth in parallel to the optical axis without rotation and to rotate the other lens barrel about the optical axis to thereby move it back and forth in parallel to the optical axis so that a front lens group frame may be moved back and forth in parallel to the optical axis as the other lens barrel rotates.

However, the driving mechanism formed with the previously-described cam groove having the bottom suffers from the following problem. With the conventional mechanism utilizing the cam slit formed in the lens barrel to drive the photographic lens, a pin member interlocked with the cam slit is operatively associated with the cam slits of two lens barrel stages, one serving to guide a movement in parallel to the optical axis and the other serving to regulate a distance of this movement. With the driving mechanism adopting the cam in the form of a groove having a bottom, on the other hand, it is impossible for the pin member to extend through the lens barrel and therefore, in addition to the lens barrel state formed with the cam groove, a driving ring member or the like must be provided to control a direction as well as a distance of the pin member's movement. In the case of a triple stage zoom lens barrel described in Japanese Patent Application Disclosure Gazette No. 1995-128567, a stationary lens barrel comprises inner and outer barrels between which a rotatable barrel is disposed. Such double barrel arrangement correspondingly enlarges the outer diameter of the lens barrel and limits the possibility of making the camera compact.

SUMMARY OF THE INVENTION

Accordingly, it is a principal object of the invention to solve the above problems by providing a driving mechanism for photographic lens allowing the camera to be made further compact without incorporating additional components such as a rotatable barrel or a driving ring and adopting a lens barrel of dual structure.

As a technical means to achieve the object set forth above, the invention provides a driving mechanism for photographic lens comprising rotation transmitting means interlocking a first driving lens barrel with a second driving lens barrel for transmitting a driving force to rotate the second driving lens barrel from the first driving lens barrel to the second driving lens barrel. By transmitting rotation of the first driving lens barrel by the rotation transmitting means to the second driving lens barrel, the need for a driving ring member or the like is eliminated and provision of such rotation transmitting means within the lens barrel makes it possible to avoid any increase in the outer diameter of the lens barrel.

As an embodiment utilizing helicoids allowing one lens barrel stage to move relative to the other lens barrel stage as the one lens barrel rotates, the invention provides a driving mechanism for photographic lens comprising rotation transmitting means interlocking a first driving lens barrel with a second driving lens barrel for transmitting a driving force to rotate the second driving lens barrel from the first driving lens barrel to the second driving lens barrel.

The invention also provides a driving mechanism for a photographic lens comprising a first driving lens barrel telescopically received by a stationary lens barrel and adapted to be rotated about the optical axis and thereby to be moved back and forth in parallel to the optical axis relative to the stationary lens barrel; a second driving lens barrel telescopically received by the first driving lens barrel so as to be rotated about the optical axis relative to the first driving lens barrel as the first driving lens barrel rotates to thereby move back and forth in a direction parallel to the optical axis and simultaneously to move a rear lens group in parallel to the optical axis by a given distance; rotation transmitting means for transmitting rotation of the first driving lens barrel to the second driving lens barrel; and a movable lens barrel telescopically received by the second driving lens barrel and adapted to be moved back and forth together with a front lens group held thereby by a given distance in a direction parallel to the optical axis as the second driving lens barrel rotates.

With a drive force transmitted from a power source, the first driving lens barrel rotates around the optical axis. Rotation of the first driving lens barrel is transmitted by the rotation transmitting means to the second driving lens barrel which then rotates around the optical axis as well as relative to the first driving lens barrel. The first driving lens barrel moves relative to the stationary lens barrel in parallel to the optical axis as the first driving lens barrel rotates. The second driving lens barrel rotates relative to the first driving lens barrel, so that the second driving lens barrel moves relative to the first driving lens barrel in a direction parallel to the optical axis. Accordingly, the second driving lens barrel moves further forth as the first driving lens barrel moves forth from the stationary lens barrel. The movable lens barrel moves further forth as the second driving lens barrel rotates. In this manner, the photographic lens can move within a moving range sufficient to vary the focal distance with a desired magnification.

As a specific embodiment, the invention provides a driving mechanism for photographic lens comprising a first driving lens barrel telescopically received by a stationary lens barrel and interlocked with the stationary lens barrel by helicoids formed on these two lens barrels so that at which the first driving lens barrel rotates about the optical axis and thereby moves back and forth in a direction parallel to the optical axis; a first translation member disposed within the first driving lens barrel so as to move back and forth in a direction parallel to the optical axis without rotation as the first driving lens barrel moves back and forth; a second driving lens barrel telescopically received by the first driving lens barrel and interlocked with the first driving lens barrel by helicoids formed on these two lens barrels so as to rotate about the optical axis and thereby to move back and forth in parallel to the optical axis together with a rear lens group held thereby by a given distance; a second translation member operatively associated with both the second driving lens barrel and the first translation member so as to move back and forth in a direction parallel to the optical axis without rotation as the second driving lens barrel moves back and forth; a movable lens barrel holding a front lens group and operatively associated with the second translation member so as to be prevented from rotating, on one hand, and operatively associated with the second driving lens barrel by helicoids so as to move back and forth by a given distance in a direction parallel to the optical axis as the second driving lens barrel rotates; and rotation transmitting means for transmitting rotation of the first driving lens barrel to the second driving lens barrel. The invention additionally provides a driving mechanism for photographic lens in which the rotation transmitting means causes the second driving lens barrel to rotate in a direction opposite to that in which the first driving lens barrel rotates.

When both the first driving lens barrel and the second driving lens barrel are rotating, relative rotation between these two lens barrels may be obtained by rotating one of them at a velocity higher than that of the other lens barrel or rotating one of them in a direction opposite to that in which the other lens barrel rotates. The invention preferably adopts the latter in view of a fact that, when these two lens barrels are rotated in a same direction but at different velocities, the velocity of one lens barrel may become too high while the velocity of the other lens barrel may become too low and, as a result, appearance of the lens barrel during its movement may lack smoothness. By rotating one lens barrel in a direction opposite to that in which the other lens barrel rotates, rotative velocities of these two lens barrels can be set practically equal to each other and the appearance can be improved. Additionally, a rotating angle of the second driving lens barrel relative to the first driving lens barrel can be easily increased, so smooth back and forth movement of the second driving lens barrel can be obtained without enlarging an obliqueness of helicoids provided between the first driving lens barrel and the second driving lens barrel.

The invention also provides rotation transmitting means to rotate the first driving lens barrel and the second driving lens barrel in opposite directions, wherein the first and second driving lens barrels are formed on their inner peripheral surfaces with inner gear teeth, respectively, and the rotation transmitting means includes a first transmission gear operatively associated by an intermediate gear with one of the inner gear teeth, and a second transmission gear provided coaxially with the first transmission gear so as to rotate in synchronization with the first transmission gear, wherein the second transmission gear is engaged with the other inner gear teeth.

The invention may further be implemented by forming inner gear teeth on an inner peripheral surface of the first driving lens barrel and forming the rotation transmitting means with a first transmission gear interlocked by the intermediate gear with the inner gear teeth, and a second transmission gear provided coaxially with the first transmission gear so as to rotate in synchronization with the first transmission gear, wherein the second transmission gear is engaged with inner gear teeth formed on the inner peripheral surface of the second driving lens barrel.

Without the intermediate gear, the first driving lens barrel and the second driving lens barrel will rotate in a same direction and, in such case, in order to move the second driving lens barrel back and forth relative to the first driving lens barrel, there is preferably established a difference in rotating velocity between the first driving lens barrel and the second driving lens barrel. To this end, a gear ratio between the first transmission gear and the second transmission gear should preferably be increased and, in consequence, any one of the first transmission gear and the second transmission gear will become bulky. Provision of the intermediate gear according to the invention allows the first and second driving lens barrels to be rotated in opposite directions and thereby to generate a differential rotating velocity between the first and second transmission gears with out making the gear bulky.

To enlarge a moving range of the photographic lens, the invention provides a driving mechanism comprising a multi stage driving lens barrel including at least a pair of adjacent driving lens barrels, each pair of adjacent driving lens barrels being operatively associated with each other by helicoids formed on the respective driving lens barrels and thereby a plurality of driving lens barrels are operatively associated one with another in succession; and rotation transmitting means disposed between each pair of adjacent driving lens barrels for interlocking the adjacent lens barrels and for transmitting a driving force from a power source to a first driving lens barrel telescopically received by a stationary lens barrel provided most adjacent a camera body, rotation of the first driving lens barrel being transmitted by the rotation transmitting means successively to the adjacent driving lens barrels so that each of the driving lens barrels is rotated relative to the adjacent driving lens barrel in succession and thereby the photographic lens is moved back and forth in a direction parallel to the optical axis for power variation or focusing.

Furthermore, the invention provides a driving mechanism for photographic lens in which the rotation transmitting means causes each driving lens barrel to rotate in a direction opposite to that in which the adjacent driving lens barrel rotates.

The invention also provides a driving lens mechanism in which said each lens barrel and the adjacent lens barrel are formed on their inner peripheral surfaces with inner gear teeth, respectively, and the rotation transmitting means includes a first transmission gear interlocked by an intermediate gear with one of the inner gear teeth, and a second transmission gear provided coaxially with the first transmission gear so as to rotate in synchronization with the first transmission gear, wherein the second transmission gear is engaged with the other inner gear teeth.

DETAILED DESCRIPTION OF THE EMBODIMENT

With reference to the accompanying drawings, some embodiments of a driving mechanism for photographic lens according to the invention will be described more in detail.

Figure 1:
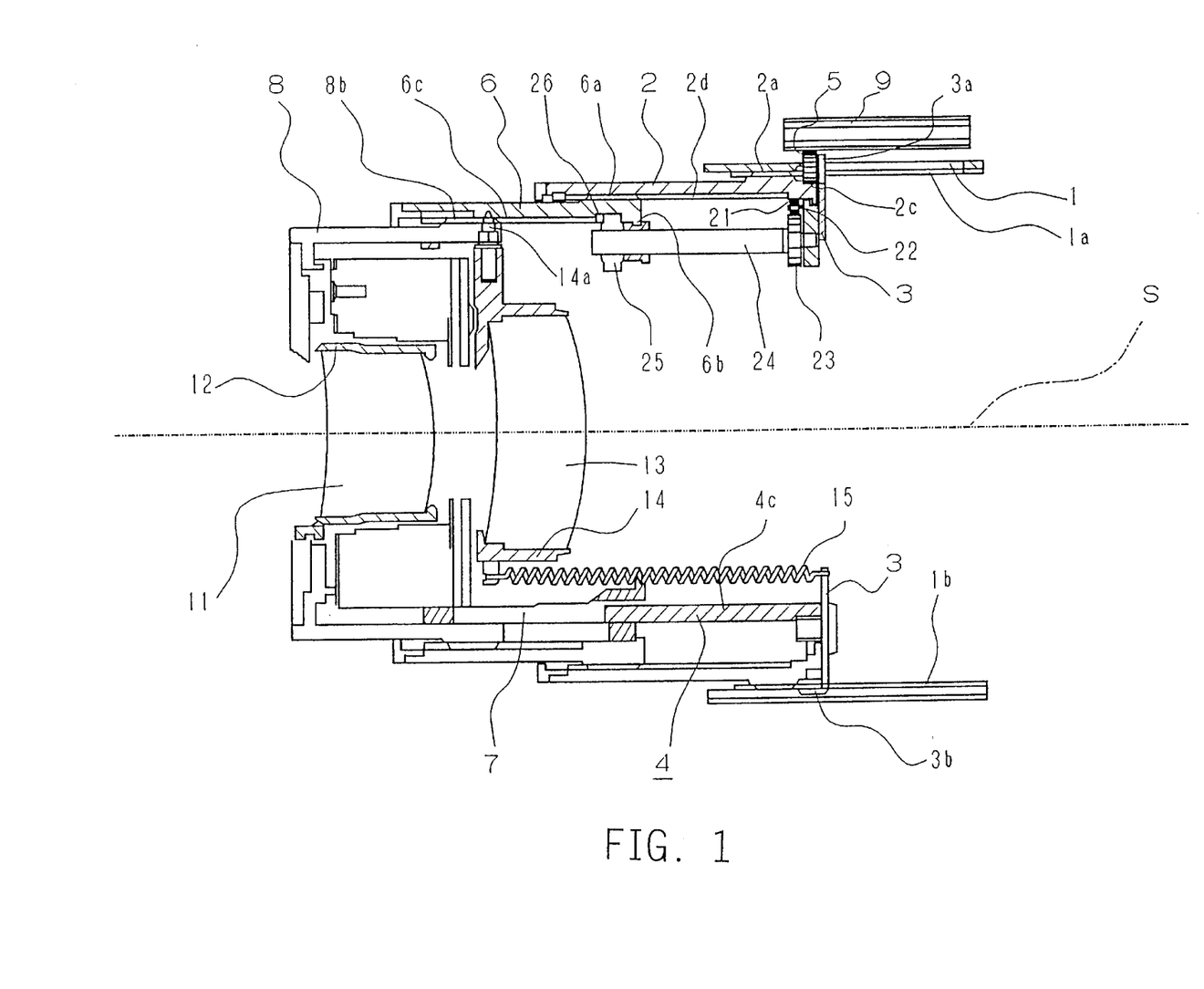
FIG. 1 is a cross-sectional view showing an optical system incorporated with a driving mechanism of the invention taken along a plane including an optical axis.
Figure 2:
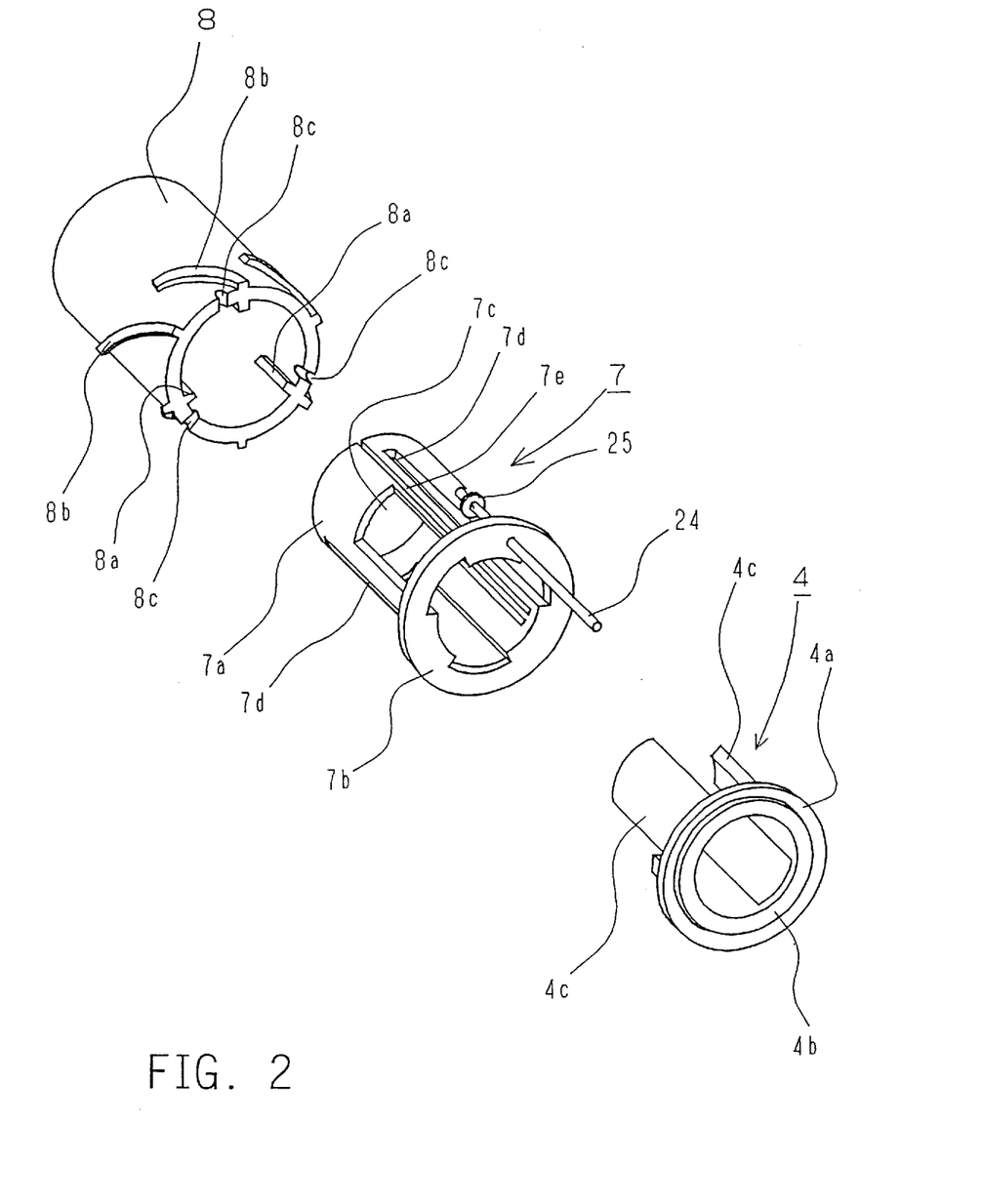
FIG. 2 is an exploded perspective view showing important components of the inventive driving mechanism.

FIG. 1 is a sectional view taken along a plane including an optical axis S, showing an optical system provided with such driving mechanism and FIG. 2 is an exploded perspective view showing important components of the driving mechanism. As shown, a stationary lens barrel 1 telescopically receives therein a first driving lens barrel 2. Stationary lens barrel 1 has a helicoid 1a formed in its inner peripheral surface. First driving lens barrel 2 has a helicoid 2a formed around an outer peripheral of its rear end so that helicoid 1a is operatively associated with helicoid 2a to rotate first driving lens barrel 2 around the optical axis S and thereby to move first driving lens barrel 2 in and out relative to stationary lens barrel 1 by a given distance.

An annular key supporting plate 3 is operatively associated with the rear end of first driving lens barrel 2. As better shown in FIG. 3, the rear end of first driving lens barrel 2 is formed with a flange 2b extending inwardly from the rear end while a rear end of a first translation member in the form of a first key 4 is formed with an annular supporting flange 4a. Key supporting plate 3 cooperates with supporting flange 4a to support flange 2b therebetween leaving an appropriate clearance. First key 4 includes an annular thick-walled portion 4b extending inwardly from supporting flange 4a so that this thick-walled portion 4b bears against key supporting plate 3 to define a clearance between supporting flange 4a and key supporting plate 3 in which flange 2b of first driving lens barrel 2 is loosely received. Thick-walled portion 4b of first key 4 is provided on its inner side with three key elements 4c extending forward therefrom.

Figure 3:
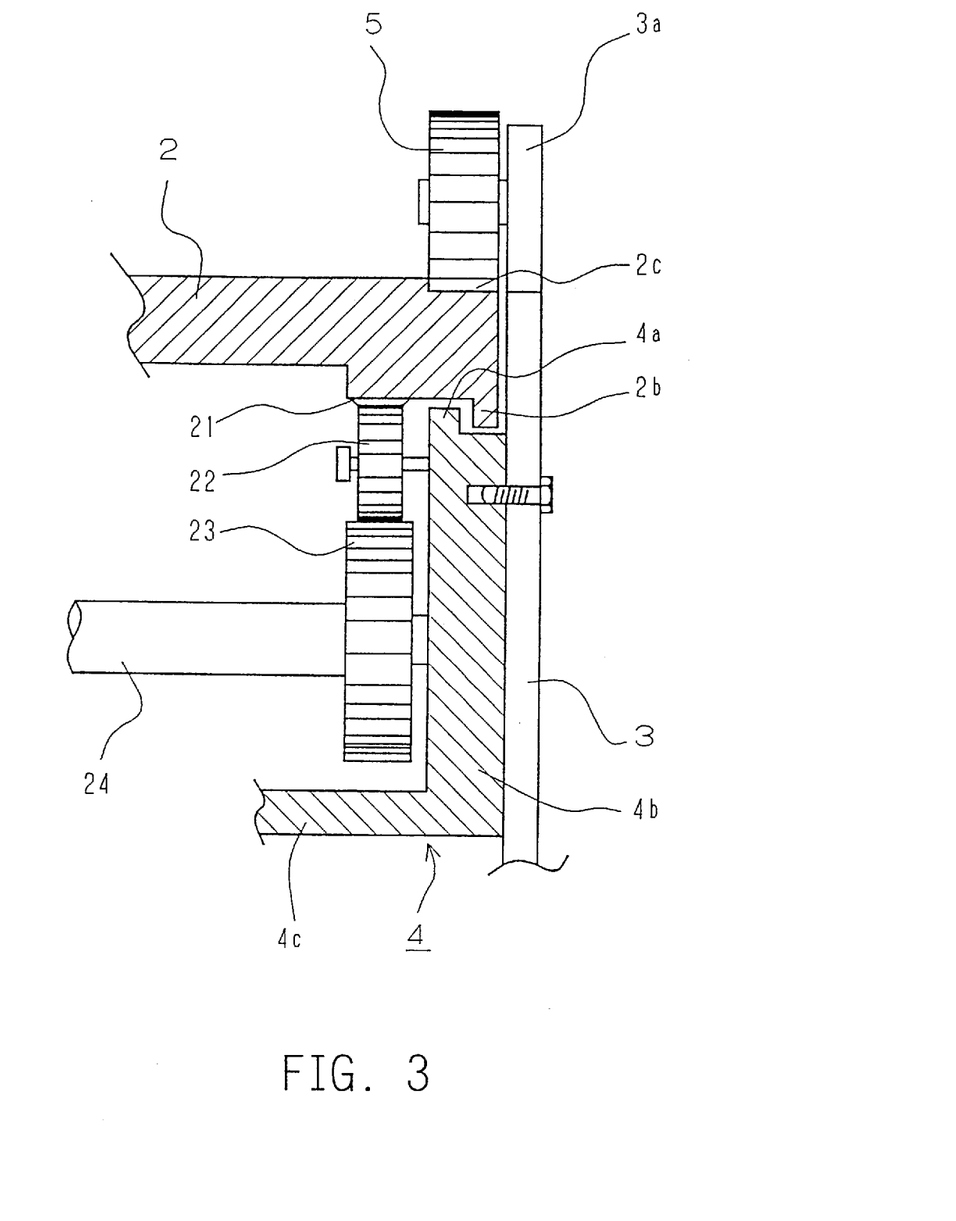
FIG. 3 is a fragmentary scale-enlarged sectional view schematically showing a part of FIG. 1 to illustrate the important components of the inventive driving mechanism.

As shown in FIGS. 1 and 3, the rear end of first driving lens barrel 2 has gear teeth 2c formed around its outer peripheral surface with which a transmission gear 5 is engaged. Transmission gear 5 is supported by a projection 3a integrally extending outwardly from an outer peripheral surface of key supporting plate 3 and diametrically opposite to this projection 3a, a guide projection 3b extends outwardly from the outer peripheral surface of key supporting plate 3. Guide projection 3b projects out through a slit 1b longitudinally formed in stationary lens barrel 1 in parallel to the optical axis. Guide projection 3b is engaged with stationary lens barrel 1 to prevent key supporting plate 3 and first key 4 from rotating. As better shown in FIG. 1, there is provided outside stationary lens barrel 1, a driving gear 9 longitudinally extending in parallel to the optical axis S and transmission gear 5 is engaged with this driving gear 9 so that these gears 5 and 9 continue to be engaged with each other even when the transmission gear 5 moves in the direction of the optical axis S.

As will be apparent from FIG. 1, first driving lens barrel 2 telescopically receives therein second driving lens barrel 2 and these two lens barrels are operatively associated with each other through the helicoid 2d formed in the inner peripheral surface of first driving lens barrel 2 and the helicoid 6a around the outer peripheral surface of the rear end of second driving lens barrel 6, so second driving lens barrel 6 moves relative to first driving lens barrel 2 by a given distance in the direction of the optical axis S as second driving lens barrel 6 rotates around the optical axis S relative to first driving lens barrel 2.

Second driving lens barrel 6 is formed around its rear end with a flange 6b extending inwardly therefrom. The rear end of a second translation member in the form of a second key 7 is operatively associated with flange 6b so as to receive this flange 6b leaving an appropriate clearance. As shown by FIG. 2, second key 7 comprises a cylindrical body 7a, a flange 7b formed around a rear end of body 7a so as to be engaged with flange 6b, and key openings 7c extending from the inner surface of flange 7b toward body 7a in which respective key elements 4c of first key 4 are loosely received. Thus, second key 7 is slidably movable relative to first key 4 in the direction of the optical axis S together with key elements 4c of first key 4 having been loosely inserted from the side of flange 7b into the respective key openings 7c.

The body 7a of second key 7 loosely receives a cylindrical movable lens barrel 8. As better shown in FIG. 2, body 7a has an appropriate number of guide slits 7d formed in parallel to the optical axis S while the rear end of movable lens barrel 8 has a corresponding number of guide projections 8a formed on its inner surface to be loosely received by the respective guide slits 7d. Movable lens barrel 8 is received by second driving lens barrel 6 as shown in FIG. 1. These two barrels are operatively associated with each other through a helicoid 6c formed on the inner peripheral surface of second driving lens barrel 6 and a helicoid 8b formed around the rear end of movable lens barrel 8. Thus, the movable lens barrel 8 moves by a given distance in the direction of the optical axis S as second driving lens barrel 6 rotates around the optical axis S. Movable lens barrel 8 has a front lens group frame 12 mounted adjacent its front end to hold a front lens group 11.

There is provided behind front lens group frame 12, a rear lens group frame 14 to hold a rear lens group 13. Rear lens group frame 14 includes an interlocking pin 14a radially extending outward from the outer peripheral surface thereof, as best shown in FIG. 1. On the other hand, second key 7 is formed, as shown in FIG. 2, with a guide slit 7e extending in parallel to the optical axis S so that said interlocking pin 14a loosely extends through guide slit 7e until its forward end is loosely received by a cam groove (not shown) formed in the inner peripheral surface of second driving lens barrel 6. Specifically, as second driving lens barrel 6 rotates and thereby moves forward, interlocking pin 14a is guided by guide slit 7e to move in parallel to the optical axis S over a distance regulated by the cam groove along which the forward end of interlocking pin 14a is guided and, consequently, rear lens group 13 moves in parallel to the optical axis S by a given distance. The distance by which rear lens group 13 moves is different from the distance by which the movable lens barrel 8 moves so that the front and rear lens groups 11 and 13 move in parallel to the optical axis S without loss of a predetermined optical relationship therebetween. As shown in FIG. 1, a regulating spring 15, for example, in the form of a tension coil spring, is suspended between key supporting plate 3 and rear lens group frame 14 so that this regulating spring 15 pulls rear lens group frame 14 and thereby brings interlocking pin 14a in close contact with the rear wall of the cam groove. Referring now to FIG. 2, the rear end of movable lens barrel 8 is formed at locations successively overlying guide slit 7e with notches 8c destined to receive the forward end of interlocking pin 14a.

Referring to FIGS. 1 and 3, the rear end of first driving lens barrel 2 is formed in its inner peripheral surface with inner gear teeth 21 with an intermediate gear 22 rotatably supported on the inner side of thick-walled portion 4b of first key 4 which is, in turn, engaged with a first transmission gear 23 rotatably supported also on the inner side of thick-walled portion 4b. A coupling shaft 24 adapted to rotate in synchronization with transmission gear 23 extends forward and has its forward end coming adjacent the rear end of second driving lens barrel 6 as the photographic lens moves to its foremost position as shown in FIG. 1. Referring to FIG. 2, coupling shaft 24 is rotatably as well as slidably supported by flange 7b of second key 7 and extends rearwardly from flange 7b toward body 7a of second key 7. The forward end of coupling shaft 24 carries a second transmission gear 25 adapted to be engaged with inner gear teeth 26 formed in the inner peripheral surface of the rear end of second driving lens barrel 6. Second transmission gear 25 is operatively associated with coupling shaft 24, for example, through a spline formed in coupling shaft 24 and thereby not only rotates in synchronization with coupling shaft 24 but also slidably moves along coupling shaft 24. Also, when second driving lens barrel 6 is moving backward relative to first driving lens barrel 2, second transmission gear 25 and inner teeth 26 are kept in engagement. In this manner, inner gear teeth 21, intermediate gear 22, first transmission gear 23, coupling shaft 24, second transmission gear 25 and inner gear teeth 26 are operatively associated one with another to serve as rotation transmitting means.

According to the inventive driving mechanism for photographic lens, as will be apparent from FIG. 1, first driving lens barrel 2 rotates relative to stationary lens barrel 1, thereby moving in parallel to the optical axis S and the first key 4 also moves in this direction as the first driving lens barrel 2 moves while second driving lens barrel 6 rotates in the direction opposite to that in which first driving barrel 6 rotates, thereby moving in parallel to the optical axis S and second key 7 also moves in this direction as second driving lens barrel 6 moves, and movable lens barrel 8 moves in parallel to the optical axis S as second driving lens barrel 6 rotates, as will be described below more in detail.

Transmission gear 5, which is in engagement with driving gear 9, rotates as driving gear 9 is rotationally driven by a power supplied from a power source (not shown). Transmission gear 5 is in engagement with gear teeth 2c and first driving lens barrel 2 is rotatably supported, so that first driving lens barrel 2 rotates around the optical axis S as transmission gear 5 rotates. First driving lens barrel 2 is interlocked with stationary lens barrel 1 through the helicoids 1a and 2a formed around stationary lens barrel 1 and first driving lens barrel 2, respectively, so that first driving lens barrel 2 moves relative to stationary lens barrel 1 by a given distance in parallel to the optical axis S. It should be understood that the movement of first driving lens barrel 2 causes no disengagement between transmission gear 5 and driving gear 9 because driving gear 9 has a face width adequately large in the direction of the optical axis S.

First driving lens barrel 2 has its rear end operatively associated with key supporting plate 3 of which guide projection 3b projects out from stationary lens barrel 1 through slit 1b of stationary lens barrel 1 so that key supporting plate 3 moves together with first driving lens barrel 2 in the same direction as that in which first driving lens barrel 2 moves. First key 4 also moves together with first driving lens barrel 2 in the direction of the optical axis S because first key 4 is fixed to key supporting plate 3.

First driving lens barrel 2 is formed with inner gear teeth 21 in its inner peripheral surface at its rear end while thick-walled portion 4b of first key 4 carries intermediate gear 22 adapted to be engaged with inner gear teeth 21. First transmission gear 23 is adapted to be engaged with intermediate gear 22 so that rotation of first driving lens barrel 2 causes first transmission gear 23 to rotate in the direction opposite to that in which first driving lens barrel 2 rotates. First transmission gear 23 rotates integrally with coupling shaft 24. Second transmission gear 25 mounted on coupling shaft 24 rotates in the same direction as that in which first transmission gear 23 rotates. Second transmission gear 25 is in engagement with inner gear teeth 26 formed in the inner peripheral surface of second driving lens barrel 6 at its rear end and therefore second driving lens barrel 6 rotates in the same direction as that in which second transmission gear 25 rotates. Thus, first driving lens barrel 2 and second driving lens barrel 6 rotate in opposite directions. Second driving lens barrel 6 is in engagement with first driving lens barrel 2 through the aid of the respective helicoids 6a and 2d and, therefore, second driving lens barrel 6 moves relative to first driving lens barrel 2 by a given distance in parallel to the optical axis S as second driving lens barrel 6 rotates relative to first driving lens barrel 2. Movement of second driving lens barrel 6 relative to first driving lens barrel 2 causes no disengagement between second transmission gear 25 and inner gear teeth 26 because second transmission gear 25 is slidably guided by coupling shaft 24.

Second key 7 operatively associated with the rear end of second driving lens barrel 6 moves as second driving lens barrel 6 moves in the same direction as that in which second driving lens barrel 6 moves. Second key 7 has key openings 7c operatively associated with the respective key elements 4c of first key 4 so that second key 7 is also prevented from rotating, because first key 4 is prevented from rotating. Movable lens barrel 8 is prevented from rotating around the optical axis S because guide projection 8a formed on the inner peripheral surface of movable lens barrel 8 loosely extends through guide slit 7d formed in body 7a of second key 7. Movable lens barrel 8 and second driving lens barrel 6 are interlocked with each other through the respective helicoids 8b and 6c and, therefore, movable lens barrel 8 moves in the direction of the optical axis S by a given distance as second driving lens barrel 6 rotates.

Front lens group 11 is held by movable lens barrel 8 so as to move in the direction of the optical axis together with movable lens barrel 8. Rear lens group 13, on the other hand, is held by rear lens group frame 14 having coupling pin 14a which is loosely received by the cam groove (not shown) formed in the inner peripheral surface of second driving lens barrel 6 so as to be guided along this cam groove. Consequently, front lens group 11 moves the same distance as that by which movable lens barrel 8 moves, but rear lens group 13 is controlled by the cam groove so as to move by a distance different from that by which movable lens barrel 8 moves. Accordingly, the front and rear lens groups 11 and 13 move in the direction of the optical axis S with a predetermined optical relationship maintained between these two groups 11 and 13 for power variation and focusing.

While the specific embodiment has been described hereinabove so that the first and second driving lens barrels 2 and 6 are rotated in opposite directions in order to achieve a relative rotation of these driving lens barrels 2 and 6, such relative rotation of the first and second driving lens barrels 2 and 6 can been achieved also by rotating them in a same direction. For example, the inner gear teeth 21 of the first driving lens barrel 2 may be directly engaged with the first transmission gear 23 without the aid of the intermediate gear 22 to rotate the first and second driving lens barrels 2 and 6 in a same direction and a velocity ratio over an extent defined between inner gear teeth 21 and inner gear teeth 26 of second driving lens barrel 6 may be appropriately selected to rotate the first and second driving lens barrels 2 and 6 in a same direction relative to each other.

Furthermore, while the specific embodiment has been described above so that the stationary lens barrel 1 telescopically receives first driving lens barrel 2, similarly, first driving lens barrel 2 receives second driving lens barrel 6, and second driving lens barrel 6 receives movable lens barrel 8 so that these first driving lens barrel 2, second driving lens barrel 6, and movable lens barrel 8 may be respectively moved back and forth, the invention is not limited to this number of lens barrels and this number may be increased to obtain the desired driving mechanism. With the driving mechanism comprising relatively many lens barrels, each pair of adjacent lens barrels may be operatively associated with each other by the aid of suitable rotation transmitting means interposed therebetween so that a driving force may be successively transmitted to the adjacent lens barrels to rotate the respective lens barrels successively. By providing each pair of adjacent lens barrels with a differential rotating velocity, each lens barrel can be moved relative to the adjacent lens barrel and the photographic lens can be moved over a distance depending on the number of lens barrels.

As will be apparent from the foregoing description, the inventive driving mechanism for photographic lens comprises a stationary lens barrel, a first driving lens barrel being rotatable relative to the stationary lens barrel; a second driving lens barrel being rotatable and movable back and forth relative to the first driving lens barrel; rotation transmitting means provided between these first and second driving lens barrels; a movable lens barrel adapted to move back and forth in the direction of the optical axis as the second driving lens barrel rotates; a front lens group held by the movable lens barrel; and a rear lens group adapted to be moved back and forth in the direction of the optical axis over a distance regulated by the second driving lens barrel for power varying or focusing. Such unique arrangement according to the invention requires neither complicated cam slits nor cam grooves which otherwise would be formed in the respective driving lens barrels and requires no driving ring member or the like in addition to the particular lens barrel formed with the cam. In this way, the invention not only allows the power varying mechanism as well as the focusing mechanism to be simplified but also allows the outer diameter of each lens barrel to be reduced and these features facilitate the photographic camera of popular type to be further size-reduced, weight-reduced, and thinned.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A driving mechanism for a photographic lens of a photographic optical system comprising:

a stationary lens barrel;

a first driving lens barrel being rotatable and movable back and forth relative to said stationary lens barrel;

a second driving lens barrel adapted to be rotated and moved back and forth relative to said first driving lens barrel so as to move a photographic lens positioned therein back and forth in a direction parallel to an optical axis of the photographic lens for power variation or focusing; and rotation transmitting means interlocking said first driving lens barrel with said second driving lens barrel for transmitting a driving force to rotate said second driving lens barrel from said first driving lens barrel to said second driving lens barrel.

2. The driving mechanism as defined in claim 1, wherein said rotation transmitting means causes said second driving lens barrel to rotate in a direction opposite to that in which said first driving lens barrel rotates.

3. The driving mechanism as defined in claim 2, wherein;

said first and second driving lens barrels are formed on their inner peripheral surfaces with inner gear teeth, respectively; and said rotation transmitting means includes a first transmission gear operatively associated by an intermediate gear with one of said inner gear teeth, and a second transmission gear provided coaxially with said first transmission gear so as to rotate in synchronization with said first transmission gear, wherein said second transmission gear is engaged with the other inner gear teeth.

4. The driving mechanism as defined in claim 2, wherein;

said first driving lens barrel is formed on its inner peripheral surface with first inner gear teeth; and said rotation transmitting means includes a first transmission gear interlocked by an intermediate gear with said first inner gear teeth, and a second transmission gear provided coaxially with said first transmission gear so as to rotate in synchronization with said first transmission gear, wherein said second transmission gear is engaged with second inner gear teeth formed on the inner peripheral surface of said second driving lens barrel.

5. A driving mechanism for a photographic lens of a photographic optical system comprising:

a stationary lens barrel;

a first driving lens barrel interlocked with said stationary lens barrel by helicoids formed on said stationary lens barrel and said first driving lens barrel such that said first driving lens barrel is rotatable and movable back and forth relative to said stationary lens barrel;

a second driving lens barrel interlocked with said first driving lens barrel by helicoids formed on said first and second driving lens barrels, said second driving lens barrel being rotated and moved back and forth relative to said first driving lens barrel so as to move a photographic lens disposed therein back and forth in a direction parallel to an optical axis for power variation or focusing; and rotation transmitting means interlocking said first driving lens barrel with said second driving lens barrel for transmitting a driving force to rotate said second driving lens barrel from said first driving lens barrel to said second driving lens barrel.

6. The driving mechanism as defined in claim 5, wherein said rotation transmitting means causes said second driving lens barrel to rotate in a direction opposite to that in which said first driving lens barrel rotates.

7. The driving mechanism as defined in claim 6, wherein;
said first and second driving lens barrels are formed on their inner peripheral surfaces with inner gear teeth, respectively; and
said rotation transmitting means includes
a first transmission gear operatively associated by an intermediate gear with one of said inner gear teeth, and
a second transmission gear provided coaxially with said first transmission gear so as to rotate in synchronization with said first transmission gear, wherein said second transmission gear is engaged with the other inner gear teeth.

8. The driving mechanism as defined in claim 6, wherein;
said first driving lens barrel is formed on its inner peripheral surface with first inner gear teeth; and
said rotation transmitting means includes
a first transmission gear interlocked by an intermediate gear with said first inner gear teeth, and
a second transmission gear provided coaxially with said first transmission gear so as to rotate in synchronization with said first transmission gear, wherein said second transmission gear is engaged with second inner gear teeth formed on the inner peripheral surface of said second driving lens barrel.

9. A driving mechanism for a photographic lens of a photographic optical system to move the photographic lens back and forth in a direction parallel to an optical axis for power variation or focusing, said driving mechanism comprising:

a stationary lens barrel;

a first driving lens barrel telescopically received by said stationary lens barrel and adapted to be rotated about the optical axis and thereby to be moved back and forth in parallel to the optical axis relative to said stationary lens barrel;

a second driving lens barrel telescopically received by said first driving lens barrel so as to be rotated about the optical axis relative to said first driving lens barrel as said first driving lens barrel rotates, thereby to be moved back and forth in a direction parallel to the optical axis and simultaneously to move a rear lens group in parallel to the optical axis by a given distance;

rotation transmitting means for transmitting rotation of said first driving lens barrel to said second driving lens barrel; and a movable lens barrel telescopically received by said second driving lens barrel and adapted to be moved back and forth together with a front lens group held thereby by a given distance in a direction parallel to the optical axis as said second driving lens barrel rotates.

10. The driving mechanism as defined in claim 9, wherein said rotation transmitting means causes said second driving lens barrel to rotate in a direction opposite to that in which said first driving lens barrel rotates.

11. The driving mechanism as defined in claim 10, wherein;
said first and second driving lens barrels are formed on their inner peripheral surfaces with inner gear teeth, respectively; and
said rotation transmitting means includes
a first transmission gear operatively associated by an intermediate gear with one of said inner gear teeth, and
a second transmission gear provided coaxially with said first transmission gear so as to rotate in synchronization with said first transmission gear, wherein said second transmission gear is engaged with the other inner gear teeth.

12. The driving mechanism as defined in claim 10, wherein;
said first driving lens barrel is formed on its inner peripheral surface with first inner gear teeth; and
said rotation transmitting means includes
a first transmission gear interlocked by an intermediate gear with said first inner gear teeth, and
a second transmission gear provided coaxially with said first transmission gear so as to rotate in synchronization with said first transmission gear, wherein said second transmission gear is engaged with second inner gear teeth formed on the inner peripheral surface of said second driving lens barrel.

13. A driving mechanism for photographic lens of a photographic optical system to move the photographic lens back and forth in a direction parallel to an optical axis for power variation or focusing, said driving mechanism comprising:

a stationary lens barrel;

a first driving lens barrel telescopically received by said stationary lens barrel and interlocked with said stationary lens barrel by helicoids formed on said stationary and first driving lens barrels so that said first driving lens barrel rotates about the optical axis and thereby moves back and forth in a direction parallel to the optical axis;

a first translation member disposed within said first driving lens barrel so as to move back and forth in a direction parallel to the optical axis without rotation as said first driving lens barrel moves back and forth;

a second driving lens barrel telescopically received by said first driving lens barrel and interlocked with said first driving lens barrel by helicoids formed on said first and second driving lens barrels so as to rotate about the optical axis and thereby to move back and forth in parallel to the optical axis together with a rear lens group held thereby by a given distance;

a second translation member operatively associated with both said second driving lens barrel and said first translation member so as to move back and forth in a direction parallel to the optical axis without rotation as said second driving lens barrel moves back and forth;

a movable lens barrel holding a front lens group and operatively associated with said second translation member so as to be prevented from rotating, on one hand, and operatively associated with said second driving lens barrel by helicoids so as to move back and forth by a given distance in a direction parallel to the optical axis as said second driving lens barrel rotates; and rotation transmitting means serving to transmit rotation of said first driving lens barrel to said second driving lens barrel.

14. The driving mechanism as defined in claim 13, wherein said rotation transmitting means causes said second driving lens barrel to rotate in a direction opposite to that in which said first driving lens barrel rotates.

15. The driving mechanism as defined in claim 14, wherein;

said first and second driving lens barrels are formed on their inner peripheral surfaces with inner gear teeth, respectively; and said rotation transmitting means includes a first transmission gear operatively associated by an intermediate gear with one of said inner gear teeth, and a second transmission gear provided coaxially with said first transmission gear so as to rotate in synchronization with said first transmission gear, wherein said second transmission gear is engaged with the other inner gear teeth.

16. The driving mechanism as defined in claim 14, wherein;

said first driving lens barrel is formed on its inner peripheral surface with first inner gear teeth; and said rotation transmitting means includes a first transmission gear interlocked by an intermediate gear with said first inner gear teeth, and a second transmission gear provided coaxially with said first transmission gear so as to rotate in synchronization with said first transmission gear, wherein said second transmission gear is engaged with second inner gear teeth formed on the inner peripheral surface of said second driving lens barrel.

17. A driving mechanism for photographic lens of a photographic optical system, comprising:

at least one pair of adjacent driving lens barrels, each pair of adjacent driving lens barrels being operatively associated with each other by helicoids formed on the respective driving lens barrels and thereby a plurality of driving lens barrels are operatively associated one with another in succession; and rotation transmitting means disposed between each pair of adjacent driving lens barrels for interlocking the adjacent driving lens barrels and for transmitting a driving force from a power source to a first driving lens barrel telescopically received by a stationary lens barrel provided most adjacent a camera body, rotation of said first driving lens barrel being transmitted by said rotation transmitting means successively to the adjacent driving lens barrels so that each of the driving lens barrels is rotated relative to the adjacent driving lens barrel in succession and thereby the photographic lens is moved back and forth in a direction parallel to the optical axis for power variation or focusing.

18. The driving mechanism as defined in claim 17, wherein said rotation transmitting means causes each driving lens barrel to rotate in a direction opposite to that in which the adjacent driving lens barrel rotates.

19. The driving mechanism as defined in claim 18, wherein:

said each lens barrel and the adjacent lens barrel are formed on their inner peripheral surfaces with inner gear teeth respectively; and said rotation transmitting means includes a first transmission gear is interlocked by an intermediate gear with one of said inner gear teeth, and a second transmission gear is provided coaxially with said first transmission gear so as to rotate in synchronization with said first transmission gear, wherein said second transmission gear is engaged with the other inner gear teeth.

20. A driving mechanism for a photographic lens of a photographic optical system comprising:

a stationary lens barrel;

a first driving lens barrel coupled to said stationary lens barrel by a helicoidal mechanism and being rotatable and movable back and forth relative to said stationary lens barrel;

a second driving lens barrel coupled to said first driving lens barrel by a helicoidal mechanism and being rotatable and movable back and forth relative to said first driving lens barrel; and a movable lens barrel coupled to said second driving lens barrel by a helicoidal mechanism and being movable back and forth relative to said second driving lens barrel.

* * * * *